US012670270B2

(12) United States Patent
Merabet

(10) Patent No.: US 12,670,270 B2
(45) Date of Patent: Jun. 30, 2026

(54) ZERO TRUST ACCESS ALGORITHMS

(71) Applicant: Abdel Aziz Merabet, Gainesville, VA (US)

(72) Inventor: Abdel Aziz Merabet, Gainesville, VA (US)

(73) Assignee: Abdel Aziz Merabet, Gainesville, VA (US)

( * ) Notice: Subject to any disclaimer, the term of this patent is extended or adjusted under 35 U.S.C. 154(b) by 78 days.

(21) Appl. No.: 18/588,602

(22) Filed: Feb. 27, 2024

(65) Prior Publication Data

US 2025/0156570 A1     May 15, 2025

Related U.S. Application Data

(60) Provisional application No. 63/576,841, filed on Mar. 10, 2023.

(51) Int. Cl.
G06F 21/60          (2013.01)
(52) U.S. Cl.
CPC .................................. G06F 21/604 (2013.01)
(58) Field of Classification Search
CPC ........ G06F 21/31; G06F 21/316; G06F 21/32;

G06F 21/44; G06F 21/50–577; G06F 21/604; G06F 21/62–629; H04L 63/08; H04L 63/0876; H04L 63/10–108
See application file for complete search history.

(56) References Cited

U.S. PATENT DOCUMENTS

2018/0247312 A1 *   8/2018   Loganathan ....... G06Q 20/4014
2020/0244347 A1 *   7/2020   Banerjee ................ G06V 20/13

* cited by examiner

*Primary Examiner* — Kevin Bechtel

(57)          ABSTRACT

A method includes converting the data into attributes. The method includes applying the attributes to a binary decision model. The binary decision module is configured to output a first access approval or a first access denial based on one more preventive measures decision algorithms. The method includes, in response to the binary decision model outputting a first approval, applying the data to a secondary discreet model. The secondary discreet model is configured to output a score based on one or more detective measures algorithms. The method includes comparing the score to an access threshold. The method includes outputting a second access approval or a second access denial based on comparing the score to the access threshold.

1 Claim, 5 Drawing Sheets

ZERO TRUST ACCESS ALGORITHMS

CROSS-REFERENCE TO RELATED APPLICATIONS

This application claims the benefit of priority of U.S. provisional application No. 63/576,841, filed Mar. 10, 2023, the entire contents of which are herein incorporated by reference.

FIELD

The present disclosure relates to computer security and, more particularly, to authentication and security access in computer systems and networks.

BACKGROUND

Current computing systems and methods utilize cryptography and access control as security measures. However, current systems and methods are not tailored to address all potential threats: They are case specific and incomplete.

As can be seen, there is a need for improved access control processes: It should be generic and comprehensive.

SUMMARY

In one aspect of the present disclosure, a method for zero-trust access control includes determining data representing an operational state of one or more computer systems. The method includes converting the data into attributes. The method includes applying the attributes to a binary decision model. The binary decision module is configured to output a first access approval or a first access denial based on one more preventive measures decision algorithms. The method includes, in response to the binary decision model outputting a first approval, applying the data to a secondary discreet model. The secondary discreet model is configured to output a score based on one or more detective measures algorithms. The method includes comparing the score to an access threshold. The method includes outputting a second access approval or a second access denial based on comparing the score to the access threshold.

DETAILED DESCRIPTION OF THE DISCLOSURE

The following detailed description is of the best currently contemplated modes of carrying out exemplary embodiments of the disclosure. The description is not to be taken in a limiting sense but is made merely for the purpose of illustrating the general principles of the disclosure, since the scope of the disclosure is best defined by the appended claims.

As discussed above, security, authentication, and access process and controls are critical in computer and network security processes. Executive order (EO) 14028 defines the Zero Trust Access (ZTA) requirements in broad terms, but does not provide an approach or an algorithm. National Institutes of Standards and Technology NIST SP 800-207 provides a high-level outline of a ZTA process and mentions four (4) different approaches for the algorithm, but no algorithm or process to implement ZTA. The four approaches include:

Score based;

Attribute based;

Singular (non-historical) based; and

Contextual (historical) based.

The National Security Agency (NSA) presents an augmented process of the compliance-based approach with an Attribute Based Access Control (ABAC) engine, but not for score-based attributes. The Defense Information Systems Agency (DISA) recommends an evolving Maturity Model for building confidence, with more detailed assessment components but essentially the same approach and no algorithm or process.

Broadly, an embodiment of the present disclosure provides a zero-trust access process and system. The zero-trust access process implements real-time algorithms that address four approaches: score based, attribute based, singular (non-historical) based, and contextual (historical) based. The real-time algorithms include a top-level algorithm with a primary compliance algorithm and a secondary risk-scoring algorithm. The primary compliance algorithm is configured to receive binary [0, 1] inputs and perform binary decisions for preventive measures. A secondary risk scoring algorithm, subordinate to the primary algorithm, is configured to receive discreet [0.0-1.0] inputs and perform decisions for detective measures.

Figure 1:
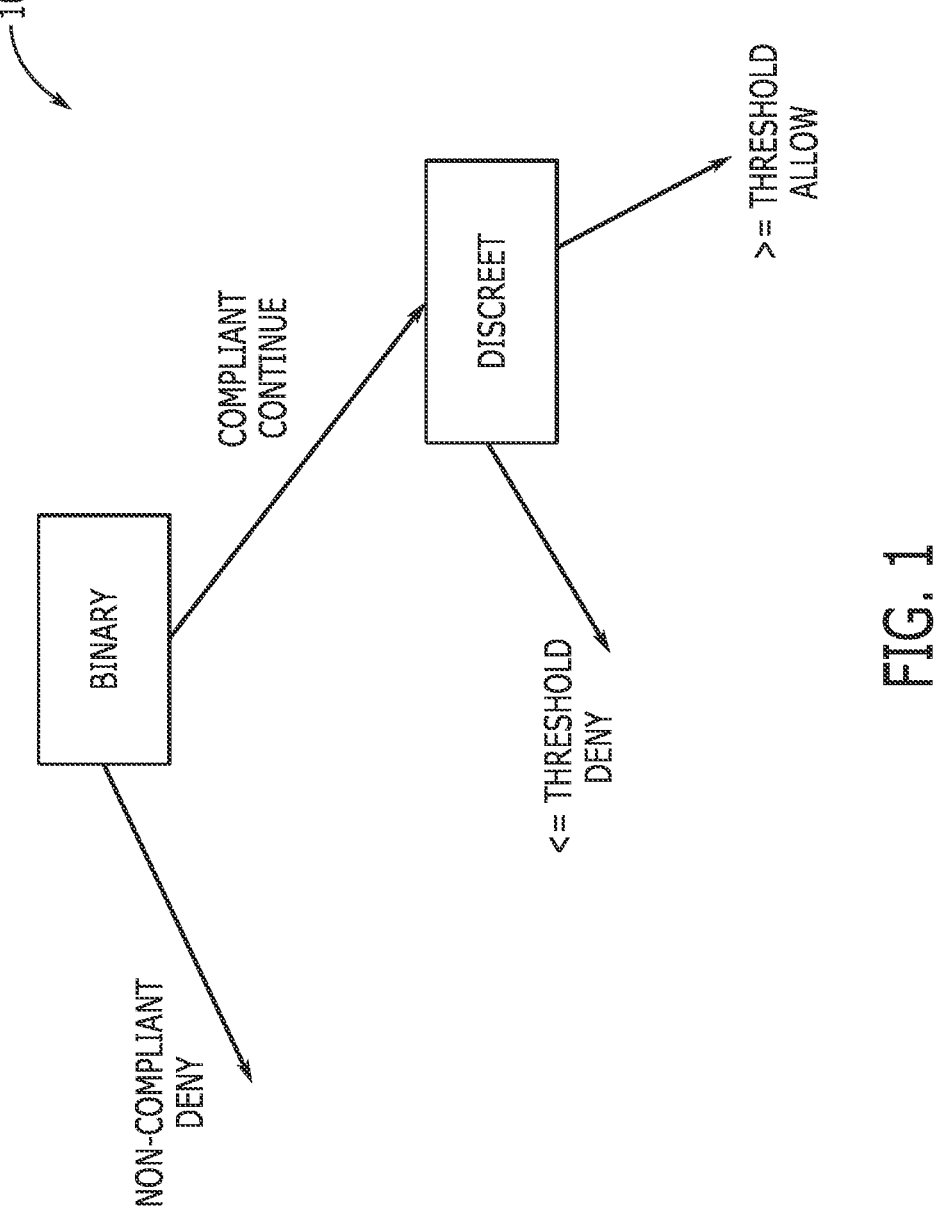
FIG. 1 is an overall block diagram of a zero-trust algorithm, according to aspects of the present disclosure.

Referring now to FIGS. 1, 2A, 2B, 3A, and 3B, FIG. 1 illustrates the top-level algorithm 10 in the zero-trust access process, according to aspects of the present disclosure. While FIG. 1 illustrates examples of components of top-level algorithm 10, additional components can be added, and existing components can be removed and/or modified.

Figure 2A:
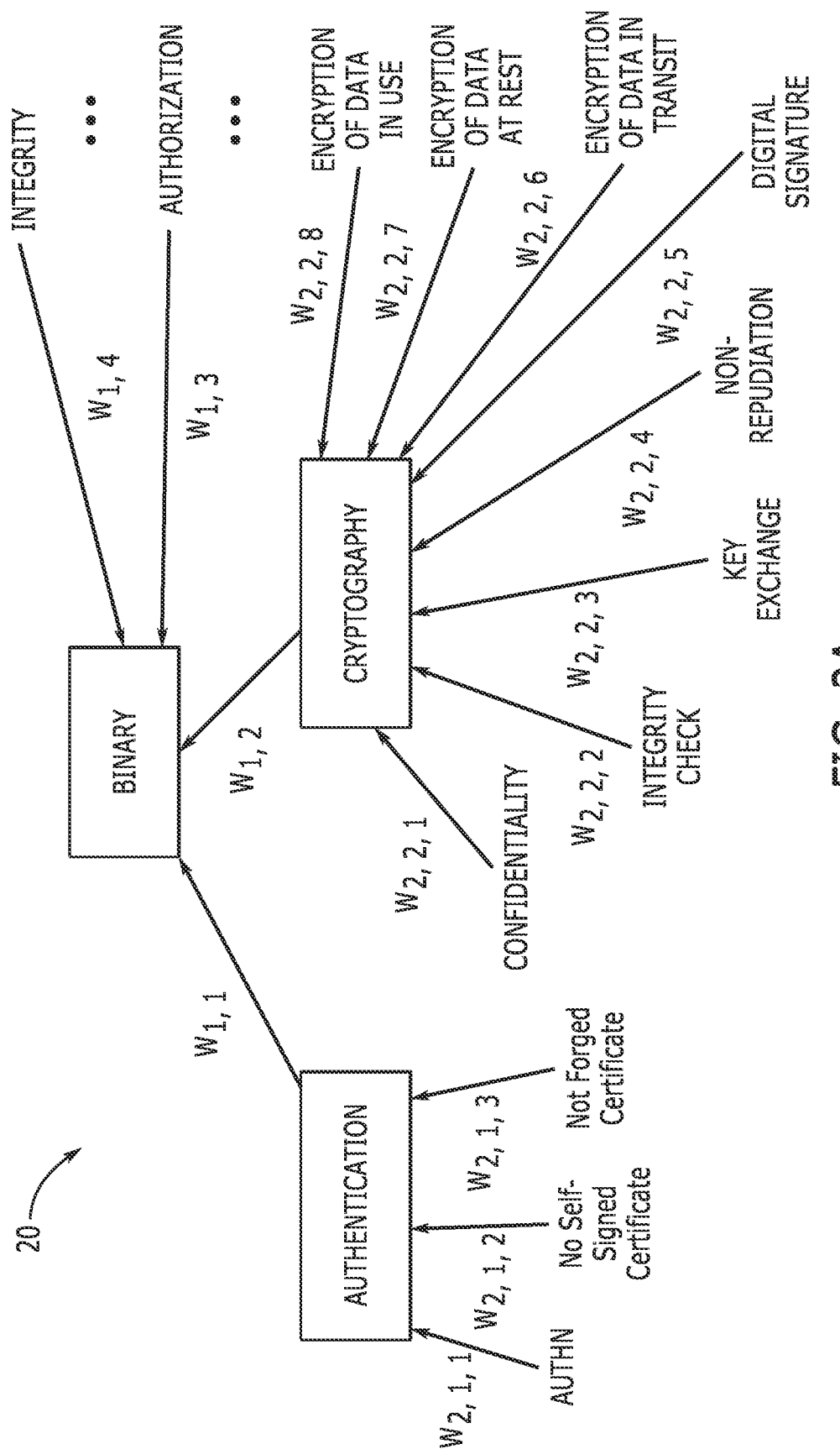
FIGS. 2A and 2B are block diagrams of a binary algorithm that forms part of the zero-trust algorithm of FIG. 1, according to aspects of the present disclosure.
Figure 2B:
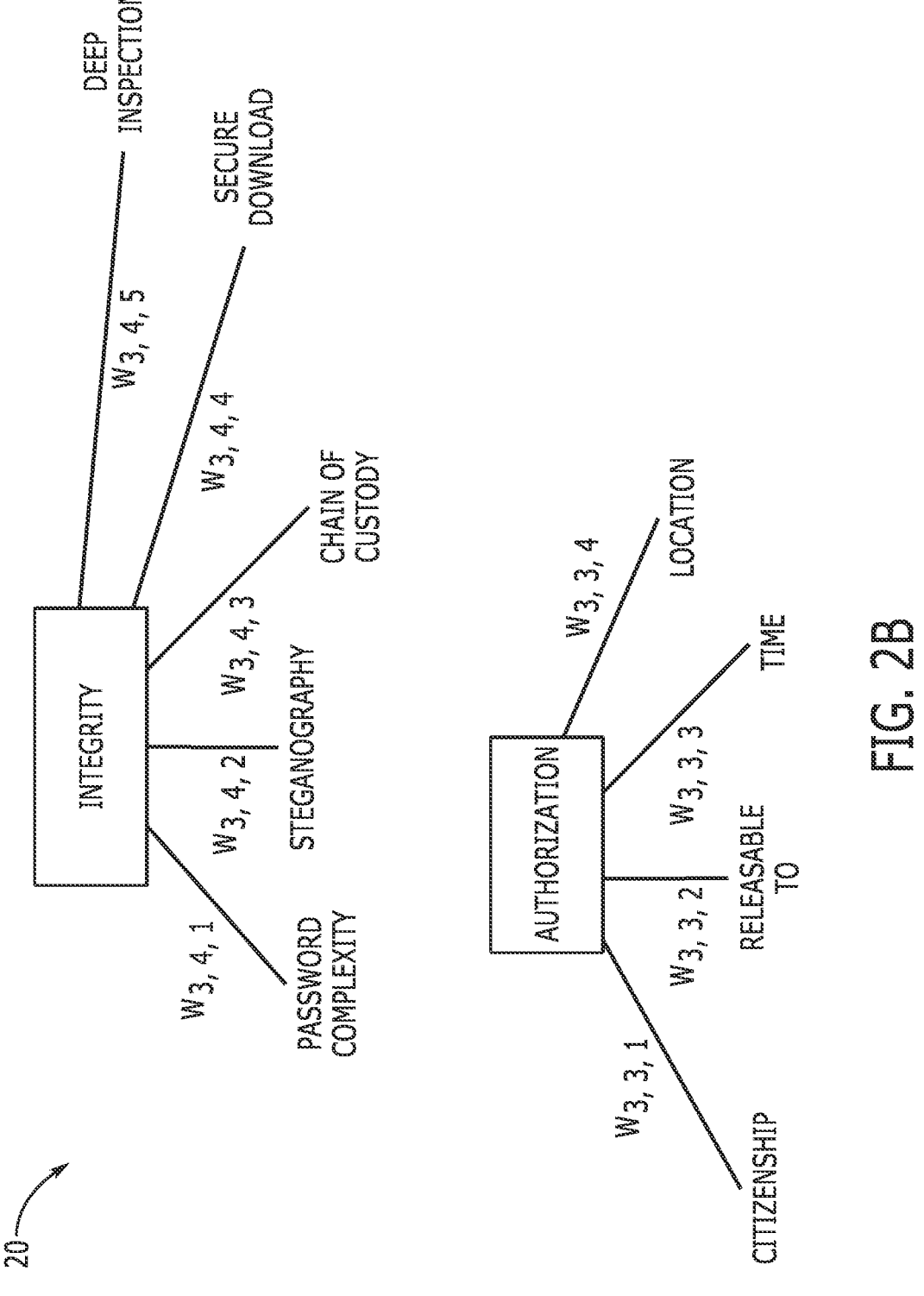
Figure 3A:
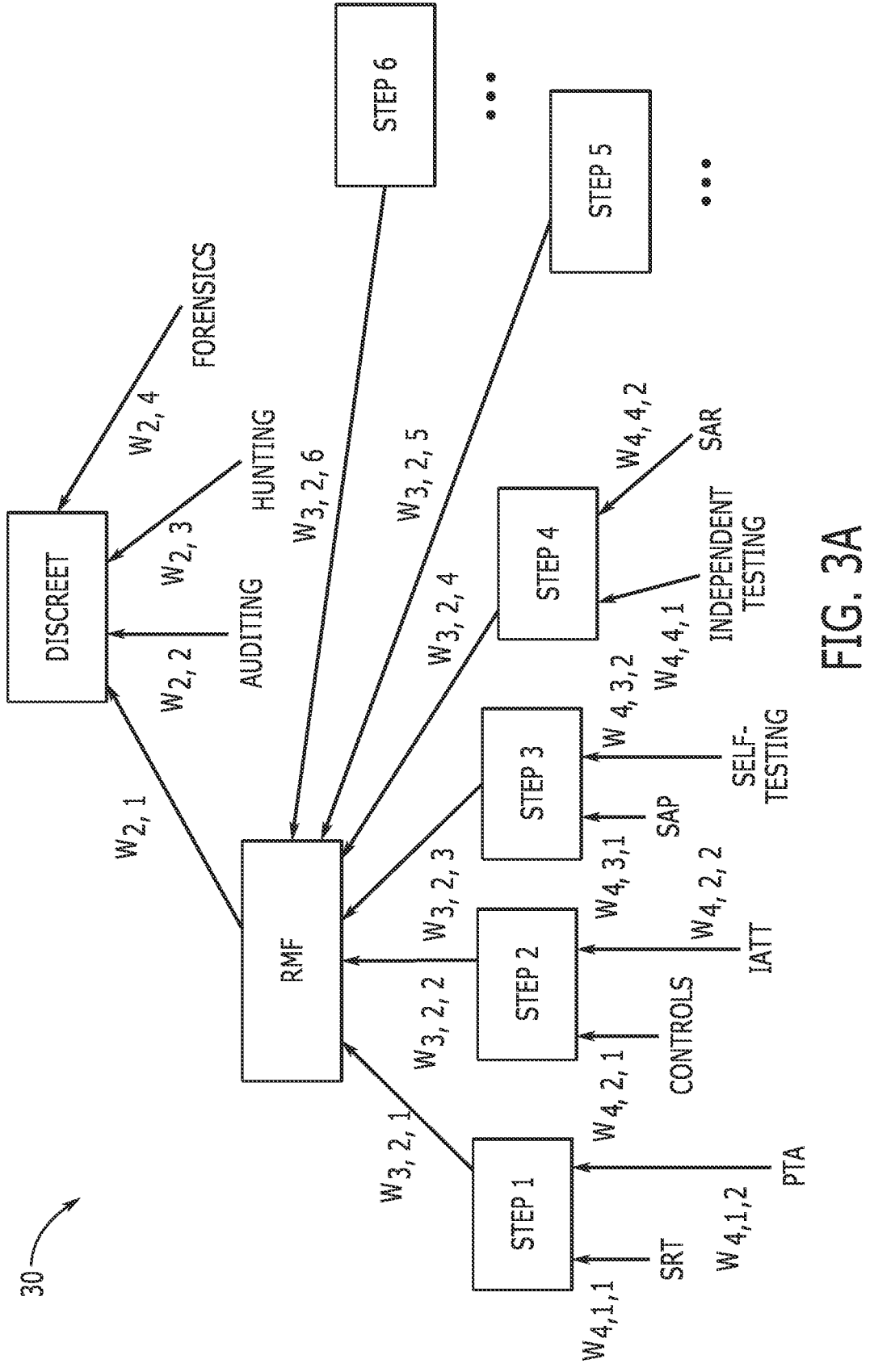
FIGS. 3A and 3B are block diagrams of a discreet algorithm that forms part of the zero-trust algorithm of FIG. 1, according to aspects of the present disclosure.
Figure 3B:
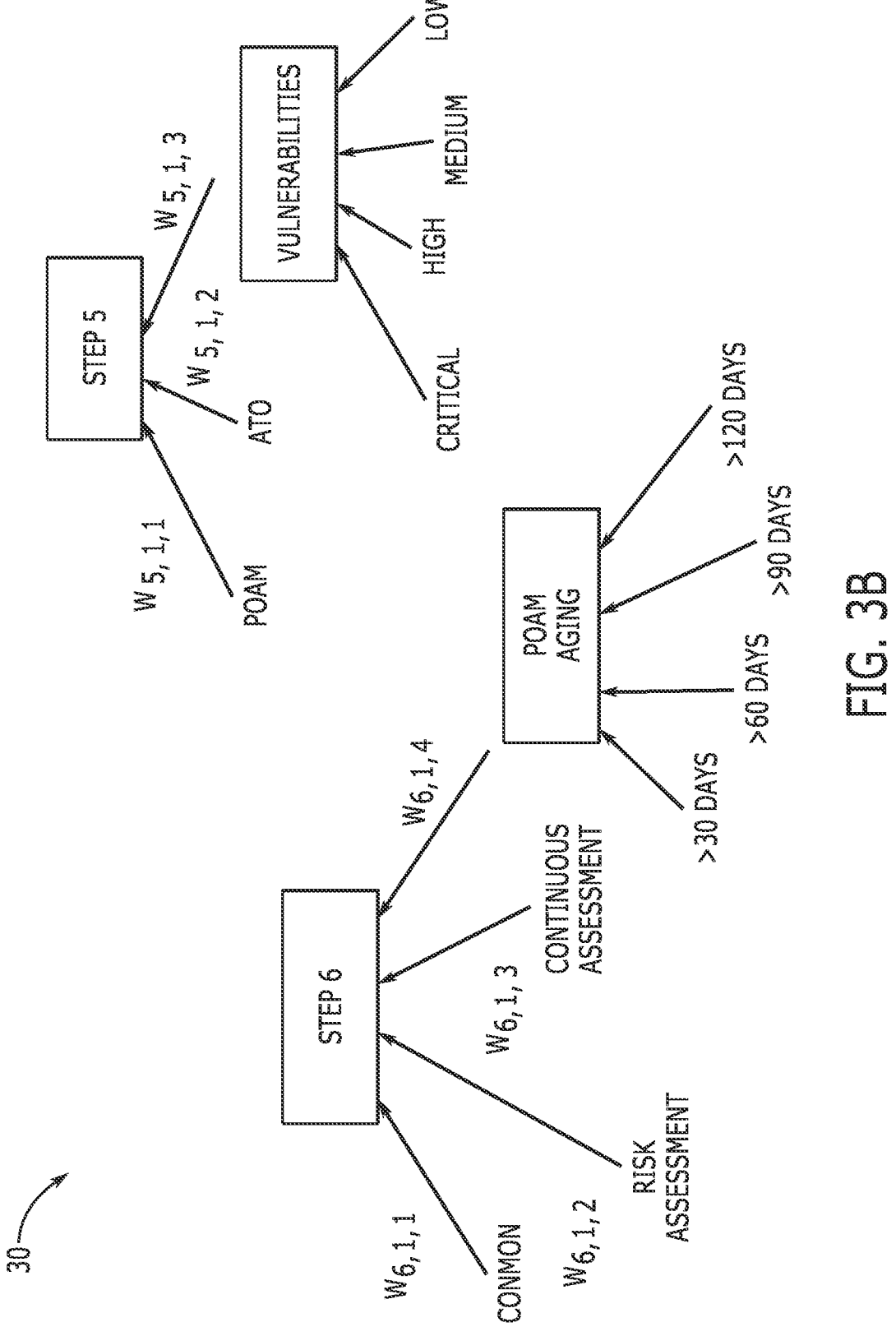

As illustrated in FIG. 1, the top-level algorithm 10 includes a primary binary algorithm 20, as illustrated in FIGS. 2A and 2B, and a secondary discreet algorithm 30, as illustrated in FIGS. 3A and 3B. In the top-level algorithm, data is first input to the primary binary algorithm 20 to determine if the input is compliant. If the input is not compliant, access is denied. If the input is compliant, then data is input into the secondary discreet algorithm 30. The output of the secondary discreet algorithm 30 is compared to a threshold to determine if access is allowed or denied.

As illustrated in FIGS. 2A and 2B, the primary binary algorithm 20 receives input data where each of the input data is weighted. The primary binary algorithm 20 receives binary [0, 1] compliance inputs and performs decisions for preventive measures. The decisions for preventive measures can be based on either of the following:

i. Experts' Opinions, a Granular Tree structure, Eigenvalue Extraction for filtering outliers, Risk Inputs, a Figure of Merit (FoM), and a Floor Function;

ii. Logic Propositions and the Theorem Proving paradigm of Artificial Intelligence;

iii. Modus Ponens and Rule-Based Reasoning Shell;

iv. By inspection; and v. ABAC Engine.

The primary binary algorithm 20 can utilize several options for processing the input data and making a decision.

In option 1, the primary binary algorithm 20 can utilize a tree structure and mathematics that are similar to a discreet tree and mathematics secondary discreet algorithm 30 described below in further detail.

In option 2, the primary binary algorithm 20 can utilize automated theorem proving-based assertions, where:

n=Intersection Operator=AND Operator;

u=Union Operator=OR Operator;

r=NOT Operator;

==>=Imply Operator; and

=/=>=Does Not Imply Operator.

In one example, the primary binary algorithm 20 can utilize the following logic for the positive proof:

Authentication n Cryptography n Authorization n Data Integrity==>Allow Access;

AuthN n No Self-Signed Certificate n No Forged Certificate==>Authentication;

Confidentiality n Integrity Check n Key Exchange n Non-Repudiation n Digital Signature n Encryption Data At Rest n Encryption Data In Transit n Encryption Data In Use==>Cryptography;

Citizenship n Releasable To n Time n Location==Authorization;

Password Complexity n Steganography n Chain Of Custody n Secure Download/Upload n Deep Inspection==>Integrity.

In one example, the primary binary algorithm 20 can utilize the following logic for the Contrapositive Proof:

r Allow Access=/=>r Authentication u r Cryptography u r Authorization u r Data Integrity;

r Authentication=/=>r AuthN u r No Self-Signed Certificate u r No Forged Certificate;

r Cryptography=/=>r Confidentiality u r Integrity Check u r Key Exchange u r Non-Repudiation u r Digital Signature u r Encryption Data At Rest u r Encryption Data In Transit u r Encryption Data In Use;

r Authorization=/=>r Citizenship u r Releasable To u r Time u r Location; and r Integrity=/=>r Password Complexity u Steganography u r Chain Of Custody u r Secure Download/Upload u r Deep Inspection.

In option 3, the primary binary algorithm 20 can utilize an expert system that is rules-based. In one example, the rules can include the logic:

IF Authentication n Cryptography n Authorization n Data Integrity THEN Allow Access ELSE Deny Access;

IF AuthN n No Self-Signed Certificate n No Forged Certificate THEN Authentication;

IF Confidentiality n Integrity Check n Key Exchange n Non-Repudiation n Digital Signature n Encryption Data At Rest n Encryption Data In Transit n Encryption Data In Use THEN Cryptography; and IF Citizenship n Releasable Ton Time n Location THEN Authorization IF Password Complexity n Steganography n Chain Of Custody n Secure Download/Upload n Deep Inspection THEN Data Integrity.

In option 4, the primary binary algorithm 20 can utilize an inspection process. In the inspection process, the algorithm allows access IF AND ONLY IF all risks at the tree leaves are=0.0, OTHERWISE it denies access. Stated differently, if all risks in the tree leaves are 0.0, then Allow, else Deny. If any risk in the tree leaves is >0.0, the deny else allow. In option 5, the primary binary algorithm 20 can utilize an ABAC Engine, e.g., Open Policy Agent (OPA).

As illustrated in FIGS. 3A and 3B, the secondary discreet algorithm 30 receives discreet [0.0-1.0] score-based inputs and determines decisions, subordinate to the primary algorithm, for detective measures. The secondary discreet algorithm 30 can based on experts' opinions, a granular tree structure, eigenvalue extraction for filtering outliers, risk inputs, FoM, and a threshold. The secondary discreet algorithm 30 can be given by a matrix formulation:

$$[E]^t = [[O]] \times [W]^t$$

Where:

$E_1 \ldots E_n$ are the Experts $W_1 \ldots W_n$ are the Weights $O_{11} \ldots Onn$ are the opinions from Experts about Weights The secondary discreet algorithm 30 can utilize matrix inversion (to extract weights). The secondary discreet algorithm 30 can utilize the QR algorithm (eigenvalue algorithm). For the QR algorithm, let A be a real matrix of which we want to compute the eigenvalues, and let $A_0$:=A. At the k-th step (starting with k=0), we compute the QR decomposition $A_k = Q_k R_k$ where $Q_k$ is an orthogonal matrix (i.e., $Q^T = Q^{-1}$) and $R_k$ is an upper triangular matrix. We then form $A_{k+1} = R_k Q_k$. Note that $$A_{k+1} = R_k Q_k = Q_k^{-1} Q_k R_k Q_k = Q_k^{-1} A_k Q_k = Q_k^T A_k Q_k$$

so all the $A_k$ are similar and hence they have the same eigenvalues.

The secondary discreet algorithm 30 can utilize a Calculation:

$$[W]^t = [[O]]^{-1} \times [E]^t.$$

The secondary discreet algorithm 30 can utilize propagation weighted Average of the Weights and Risks given by:

$$W_{i-1} = \left( \sum_j W_{i,j} \times R_{i,j} \right) / \sum W_{i,j}.$$

The secondary discreet algorithm 30 can utilize the question:

Inputs (Risks) =

Probability of Occurrence × Impact of a Single Occurrence.

The secondary discreet algorithm 30 can utilize the following equation:

FoM=1.0–Risk.

The primary algorithm 20 and the secondary discreet algorithm 30 can utilize Maturity Models (MMs), given by the levels:

MM Level 1: Preparation. The current tree structures are considered to be at this level.

MM Level 2: Baseline. Extra layers of granularity added from NSA and DoD best practices.

MM Level 3: Intermediate. The algorithm will be scripted using Python.

MM Level 4: Advanced. Real-time mining of attributes from ZTA Services, e.g., Splunk, FireEye, Nessus, Xacta, McAfee, etc.

The algorithms and processes described above can be implemented on one or more computing systems (hereinafter computing systems). The computing system can include one or more computing device operating to perform the zero-trust access process. In embodiments, the computing system includes a processing device coupled to a communication device. The processing device is also coupled to a memory device, and an input/output ("I/O") interface. In embodiments, the communication interface enables the computing system to communicate with other devices and systems via one or more networks.

According to the aspects of the present disclosure, the computing system can store and execute one or more applications that implement the zero-trust process and algorithms described above. The one or more applications can include the necessary logic, instructions, and/or programming to perform the processes and methods described herein. The one or more applications can be written in any programming language. For example, for implementation, one or more of the following can be utilized a. spreadsheet (e.g., Excel) tabulation;
    b. Python script;
    c. Tools: i. Expert Choice;
    d. For Theorem Proving: CARINE; and
    e. For Expert System: Drools reasoning.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise. While the above is a complete description of specific examples of the disclosure, additional examples are also possible. Thus, the above description should not be taken as limiting the scope of the disclosure which is defined by the appended claims along with their full scope of equivalents.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements. As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

It should be understood, of course, that the foregoing relates to exemplary embodiments of the disclosure and that modifications can be made without departing from the spirit and scope of the disclosure as set forth in the following claims.

What is claimed is:

1. A method for zero-trust access control, comprising:

determining, for each of three or more computer systems, data representing the operational state of the three or more computer systems;

converting, for each of three or more computer systems, the data into binary attributes for each of three or more computer systems, the binary attributes comprising the following: AuthN, No Self-Signed Certificate, No Forged Certificate, Confidentiality, Integrity Check, Key Exchange, Non-Repudiation, Digital Signature, Encryption Data At Rest, Encryption Data In Transit, Encryption Data In Use, Citizenship, Releasable To, Time, Location, Password Complexity, Steganography, Chain Of Custody, Secure Download/Upload, and Deep Inspection;

applying, for each of three or more computer systems, the attributes to a binary decision model for preventive measures, wherein the binary decision module is configured to output, for each of three or more computer systems and using the respective attributes, a binary decision model output that is either a first access approval or a first access denial, the binary decision module using the following Logical Function (LF):

LF (AuthN/No Self-Signed Certificate/No Forged Certificate)$\wedge$(Confidentiality$\wedge$Integrity Check$\wedge$Key Exchange$\wedge$Non-Repudiation$\wedge$Digital Signature/Encryption Data At Rest$\wedge$Encryption Data In Transit$\wedge$Encryption Data In Use)$\wedge$(Citizenship A Releasable To A Time$\wedge$Location)$\wedge$(Password Complexity$\wedge$Steganography$\wedge$Chain Of Custody$\wedge$Secure Download/Upload$\wedge$Deep Inspection)$\Longrightarrow$the binary decision model output);

determining, for a first computer system in the three or more computer systems, that the binary decision model output the first access denial;

determining, for a second computer system and a third computer system in the three or more computer systems, that the binary decision model output the first access approval;

in response to the binary decision model outputting the first access approval, applying, for each of the second computer system and the third computer system in the three or more computer systems, the data to a secondary discreet model for detective measures, wherein the secondary discreet model is configured to output a score, the secondary discreet model comprising each of the following procedural methods:

a granular tree structure, eigenvalue extraction using the QR algorithm for filtering outliers, risk inputs, a figure of merit (FoM), a floor function, and a square matrix formulation of experts' opinions, the square matrix formulation using the equation:

$$[E]^t = [[O]] \times [W]^t,$$

where: $E_1 \ldots E_n$ are experts, $W_1 \ldots W_n$ are weights, $O_{11} \ldots O_{nn}$ are the opinions from the experts about the weights, wherein the inputs to the secondary discreet model are discrete attribute scores in the range of [0.0-1.0];

converting, for each of the second computer system and the third computer system in the three or more computer systems, the data into discreet attributes for each of the second computer system and the third computer system in the three or more computer systems, the discreet attributes comprising the following:

System Review Test (SRT); Privacy Threshold Assessment (PTA); Controls; Interim Authorization To Test (IATT); Security Assessment Plan (SAP); Self-Testing; Independent Testing; Security Assessment Report (SAR); Plan of Action and Milestones (POAM); Authorization To Operate (ATO); Vulnerabilities of level: Critical, High, Medium, and Low; Continuous Monitoring (ConMon); Risk Assessment; Continuous Assessment; POAM Aging at periods of: >30 days, >60 days, >90 days, and >120 days; Auditing; Hunting; and Forensics;

in response to outputting, for each of the second computer system and the third computer system in the three or more computer systems, the score, comparing the score to an access threshold using a Weighted Average Function (WAF) of:

WAF (SRT; PTA; Controls; IATT; SAP; Self-Testing; Independent Testing; SAR; POAM; ATO; Vulnerabilities of level: Critical, High, Medium, and Low; ConMon; Risk Assessment; Continuous Assessment; POAM Aging at periods of: >30 days, >60 days, >90 days, and >120 days; Auditing; Hunting; and Forensics);

in response to comparing the score, determining that the score for the second computer system in the three or more computer systems is less than the access threshold;

in response to comparing the score, determining that the score for the third computer system in the three or more computer systems is greater than or equal to the access threshold;

in response to determining that the score for the second computer system in the three or more computer systems is less than the access threshold, outputting a second access denial;

in response to determining that the score for the third computer system in the three or more computer system is greater than or equal to the access threshold; outputting a second access approval; and performing, for each of three or more computer systems, the zero-trust access control based on one of: the first access denial, the second access approval, or the second access denial.

* * * * *